United States Patent
Kushiro et al.

(10) Patent No.: US 6,735,048 B2
(45) Date of Patent: May 11, 2004

(54) TAPE CASSETTE

(75) Inventors: Sunao Kushiro, Chiba (JP); Hiroshi Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/204,777
(22) PCT Filed: Dec. 25, 2001
(86) PCT No.: PCT/JP01/11378
§ 371 (c)(1), (2), (4) Date: Nov. 25, 2002
(87) PCT Pub. No.: WO02/052563
PCT Pub. Date: Jul. 4, 2002

(65) Prior Publication Data
US 2003/0147334 A1 Aug. 7, 2003

(30) Foreign Application Priority Data
Dec. 25, 2000 (JP) .................................. 2000-392873

(51) Int. Cl.⁷ ............................................. G11B 23/023
(52) U.S. Cl. ....................................................... 360/132
(58) Field of Search ......................... 360/132; 369/291; 242/347, 347.1

(56) References Cited

U.S. PATENT DOCUMENTS 5,390,870 A   2/1995   Sawada et al.

FOREIGN PATENT DOCUMENTS

| EP | 0 572 925 | 12/1993 |
|----|-----------|---------|
| JP | 4-319589  | 11/1992 |
| JP | 5-334847  | 12/1993 |

Primary Examiner—George J. Letscher
(74) Attorney, Agent, or Firm—Frommer Lawrence & Haug LLP; William S. Frommer

(57) ABSTRACT

A cassette casing 1 has a front lid 5 on its front surface side and a shutter plate 6 retreating on the upper surface of the cassette casing 1 in the way of sliding correspondingly with the operation of the front lid 5 being open and retreated from a mouth. In order to prevent a rectangular display label 8 from being fitted on the upper surface which is the passage for movement of the shutter plate 6 of the cassette casing 1, the edge on a side opposite to the front lid 5 of the shutter plate 6 and the edge of the cassette casing against which that edge of the shutter abuts are each made into a curvilinear configuration to have thereby made the passage 9 for movement of the shutter meander.

3 Claims, 4 Drawing Sheets

TAPE CASSETTE

TECHNICAL FIELD

The present invention relates to a tape cassette that is a recording medium in an extremely small-sized camcorder, or the like. More particularly, the invention is directed to a tape cassette that has been arranged to prevent a display label from being pasted onto a portion other than a label area surface.

BACKGROUND ART

FIG. 5 is an outer appearance perspective view seen from a rear surface side of a conventional tape cassette in which a front lid is closed; and FIG. 6 is an outer appearance perspective view seen from a rear surface side of the same tape cassette in which the front lid is open.

Reference numeral 1 denotes a cassette casing constituting an outer covering member of the tape cassette and within that there are accommodated a tape supply side reel 2 and tape take-up side reel 3, onto which a magnetic tape is wound. On a front surface side of the cassette casing 1, the magnetic tape T which has been drawn out from the tape supply side reel 2 crosses a mouth 4 and is taken up onto the tape take-up side reel 3. The front lid 5 serves as a protector that protects the magnetic tape T crossing the mouth 4.

The front lid 5 is opened correspondingly with the operation of the tape cassette being loaded into a recording/reproducing apparatus not illustrated, whereby the magnetic tape T is drawn out from the mouth 4 and is loaded onto a drum. Also, when the front lid 5 is open to operation, a shutter plate 6 retreats as sliding on the upper surface of the cassette casing 1 together with the front lid 5, whereby the front lid 5 is largely retracted from the mouth 4. Incidentally, on a rear surface of the cassette casing 1 there is provided a label area 7 on which the rectangular display label 8 is pasted.

Meanwhile, the shutter plate 6 that retreats together with the front lid 5 slides on an upper surface passage 9 recessed by the extent corresponding to the thickness of the shutter plate of the cassette casing 1, and when the shutter plate 6 has been completely made open, a rear end edge 6a thereof abuts against a level difference edge 1a of the cassette casing 1 and is stopped.

In the above-described tape cassette, the display label 8 which must originally be pasted on the label area 7 is sometimes erroneously pasted on the upper surface passage 9 of the cassette casing 1 as illustrated in FIG. 7. However, when the display label 8 is pasted on the upper surface passage 9 of the cassette casing 1, the shutter plate 6 is interfered with the pasted display label 8, with the result that the retreat movement of the shutter plate 6 becomes impossible. As a result, there comes up a decisive matter that the loading operation of the tape cassette becomes incomplete.

Also, there occurs the inconvenience that the display label 8 is peeled off or broken due to the interference between the shutter plate 6 and the display label 8. Also, there occurs another problem, that the shutter plate 6 rides over the display label 8, with the result that the shutter plate 6 may be deformed, or, in the worst case, it may become difficult to eject the tape cassette.

For example, as the countermeasures against those problems, a notice for preventing the pasting of the display label 8 to the upper surface passage 9 of the cassette casing 1 is attached. However, it is difficult to reliably prevent such problems.

Also, as another measure taken with respect to such problems, there is a case where a space was provided in height so that, even when the display label 8 has been pasted on the upper surface passage 9 of the cassette casing 1, the shutter plate 6 is not interfered with the label 8. However, in this case, the space which corresponds to the thickness of the label plus an extra space for unstuck state thereof becomes necessary, whereby the increase in the height of the tape cassette raises such a problem as disadvantage for the miniaturization.

Further, in the above-described construction, in a case where the shutter plate 6 is formed with an opaque member, as illustrated in FIG. 5, the tape supply side reel 2 and tape take-up side reel 3 are hidden by the shutter plate 6 and cannot be seen from the outside in the closed state of the front lid 5. For this reason, there also comes up the problem that the taking-up status of the tape on the tape supply side reel 2 and tape take-up side reel 3 cannot be recognized.

The present invention has been made in order to solve the above-described problems, and an object of the present invention is to provide a tape cassette in which a configuration is modified to visually prevent any display label from being pasted on the passage for movement of the shutter of the cassette casing, so that a user is encouraged to attach the display label on the normal area.

DISCLOSURE OF THE INVENTION

To attain the above-described object, the tape cassette of the present invention is formed with being curved the edge on a side opposite to the front lid of the shutter and the edge of the cassette casing against which the edge of the shutter abuts, whereby the passage for movement of the shutter forms meanderings so that a rectangular display label can not fit within the upper surface of the cassette casing which constitutes the passage for movement of the shutter.

According to the tape cassette as constructed above, since the passage for movement of the shutter has been made to meander, it does not happen that the rectangular display label fits within the passage for movement, and it is possible to recognize that the passage for movement is not the area used for pasting the display label.

BEST MODE FOR CARRYING OUT THE INVENTION

Figure 1:
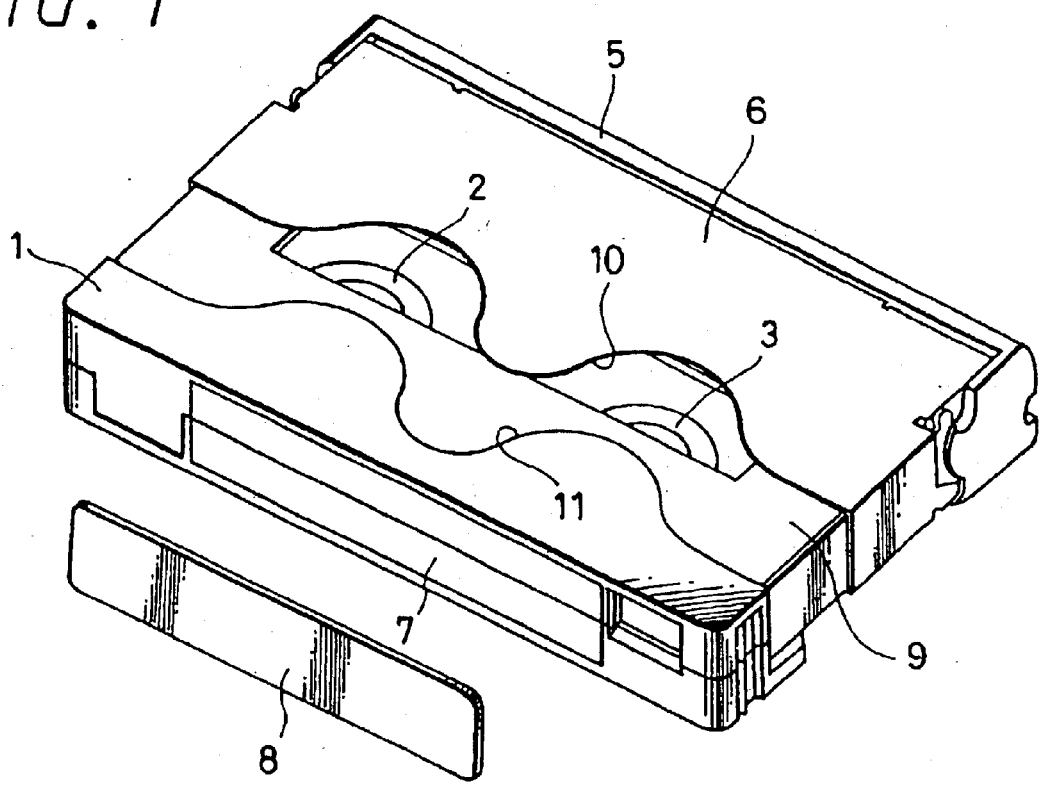
FIG. 1 is a perspective view of a closed state of a front lid of a tape cassette according to an embodiment of the present invention.
Figure 2:
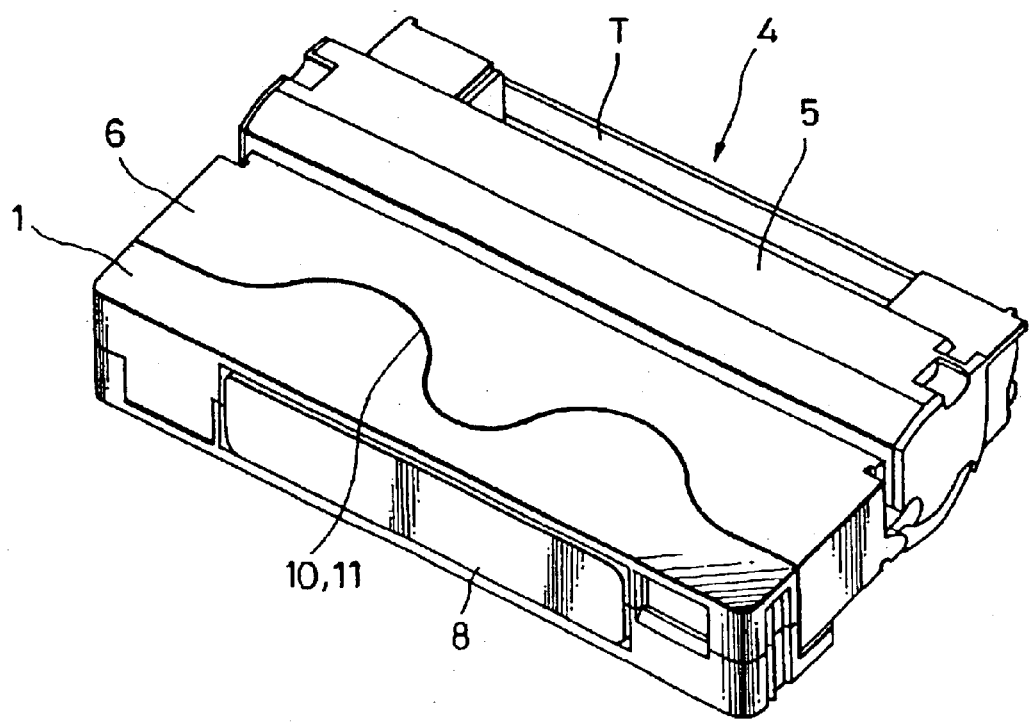
FIG. 2 is a perspective view of an open state of the front lid of the same tape cassette according to the embodiment of the present invention.
Figure 5:
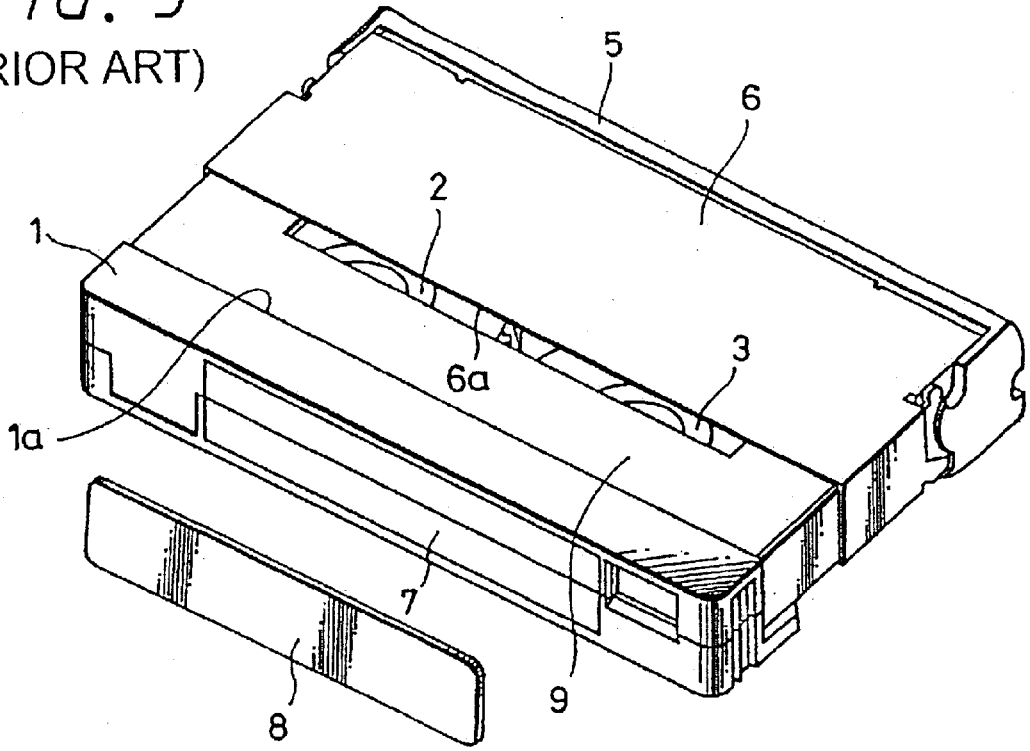
FIG. 5 is a perspective view of a closed state of a front lid of a conventional tape cassette.
Figure 6:
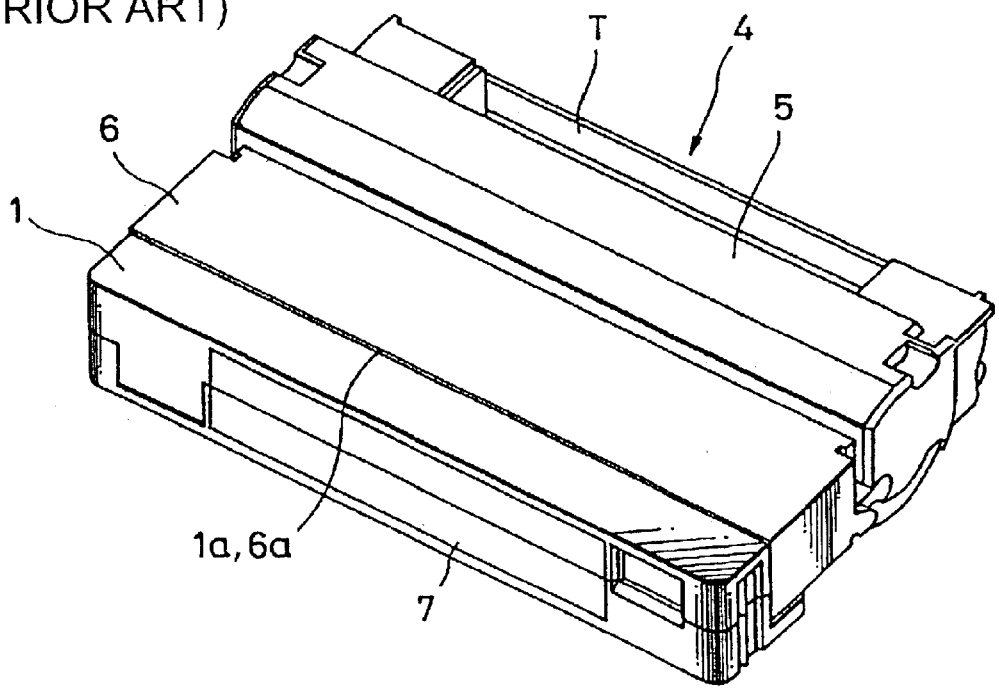
FIG. 6 is a perspective view of an open state of the front lid of the same tape cassette.
Figure 7:
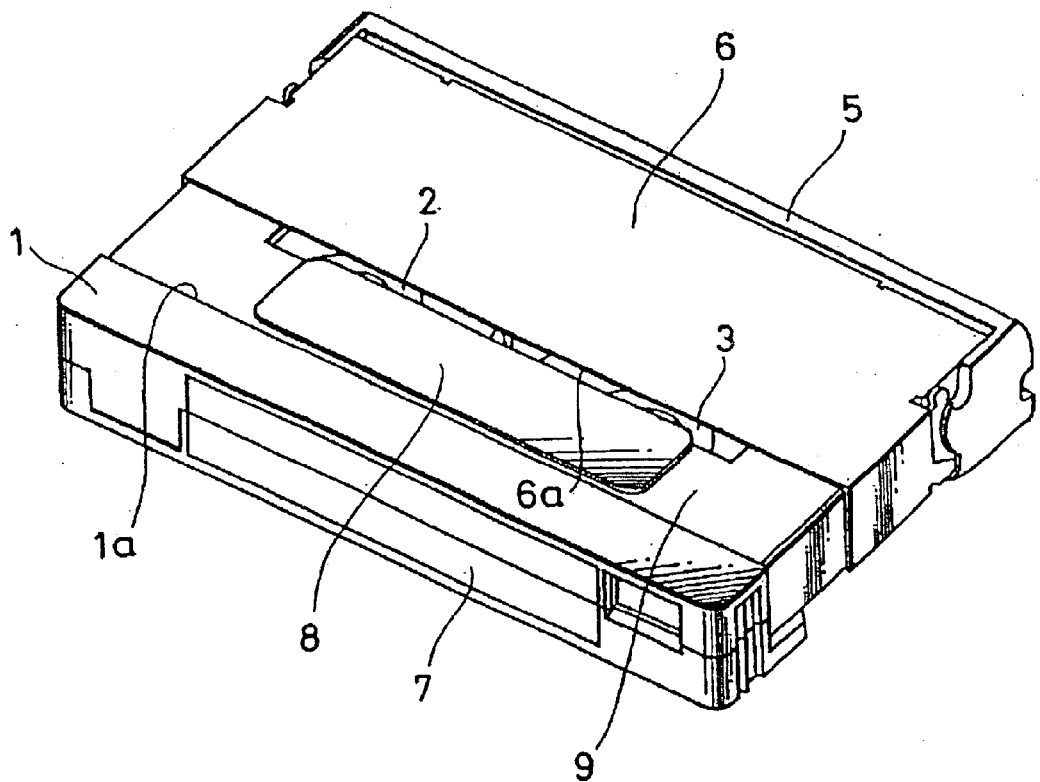
FIG. 7 is a perspective view of the conventional tape cassette in a state where a display label has been pasted on the passage for movement of the shutter.

Hereinafter, with reference to the drawings, a preferred embodiment of a tape cassette according to the present invention will be explained. FIG. 1 is an outer appearance perspective view seen from a rear surface side of the tape cassette according to the present invention, in which a front lid is closed; and equally FIG. 2 is an outer appearance perspective view seen from the rear surface side of the tape cassette according to the present invention, in which the front lid is open. The same reference numerals are assigned to the portions corresponding to those of the conventional tape cassette illustrated in FIG. 5.

The reference numeral 1 denotes a cassette casing constituting an external covering member of the tape cassette, wherein a tape supply side reel 2 and a tape take-up side reel 3 onto which a magnetic tape is wound are accommodated. On a front surface side of the cassette casing 1, the magnetic tape T which has been drawn out from the tape supply side reel 2 crosses a mouth 4 and is taken up onto the tape take-up side reel 3. The front lid 5 protects the magnetic tape T crossing that mouth 4.

The front lid opens correspondingly with the operation of the tape cassette being loaded into a recording/reproducing apparatus not illustrated, whereby the magnetic tape T is drawn out from the mouth 4 and is loaded onto a drum. Also, when the front lid 5 is open to operate, a shutter plate 6 retreats as sliding on the upper surface of the cassette casing 1 together with the front lid 5, whereby the front lid 5 is largely retracted from the mouth 4. Incidentally, on the rear surface of the cassette casing 1 there is provided a label area 7 on which a rectangular display label 8 is pasted.

Meanwhile, the end edge of a side opposite to the front lid 5 of the shutter plate 6 is formed into a wavy curvilinear end 10. In detail, the wavy curvilinear end 10 is configured to enable the tape supply side reel 2 and tape take-up side reel 3 within the cassette casing 1 to be seen between the wave forms. As a result, it is possible to recognize the tape winding status of the tape supply side reel 2 and tape take-up side reel 3.

Also, a level difference edge of the cassette casing 1, against which the wavy curvilinear end 10 of the shutter plate 6 abuts, is formed into a wavy curvilinear end 11 the configuration of which coincides and engages with that of the wavy curvilinear end 10. Specifically, an upper surface passage 9 of the cassette casing 1 on which the shutter plate 6 slides has a wavy configuration. Accordingly, the upper surface passage 9 is a meandering passage into which the rectangular display label 8 cannot be fitted.

As described above, in the tape cassette according to the present invention, the upper surface passage 9 on which the shutter plate 6 slides has been formed into a meandering configuration of passage, and therefore, even when the user erroneously tries to attach the display label 8 onto the upper surface passage 9, the display label 8 is not fitted into the upper surface passage 9. Therefore, the user can immediately recognize that the upper surface passage 9 is not the area for pasting the display label, thereby preventing the display label 8 from being pasted onto the upper surface passage 9.

In addition, by the upper surface passage 9 being formed in a meandering configuration, it is convenient that the user can visually discriminate the upper surface passage 9 from the area for pasting the display label 8.

Figure 3:
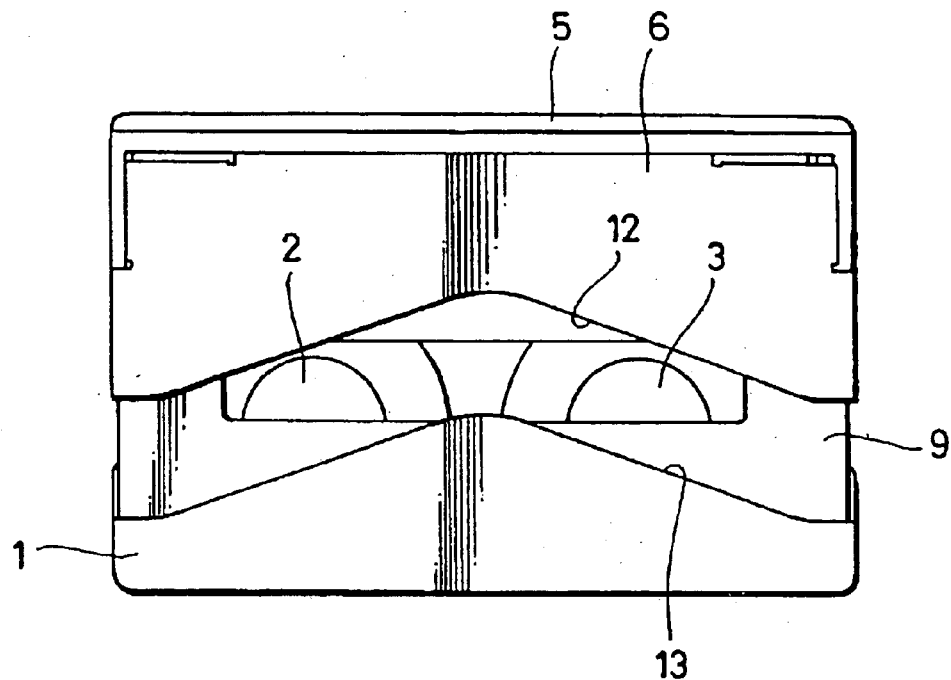
FIG. 3 is a plan view of the tape cassette illustrating another example of the meandering passage.

In another embodiment of the present invention, as described in FIG. 3, a crest-shaped curvilinear end edge 12 of the shutter plate 6 is formed as another shape of meandering configuration, and the level difference edge of the cassette casing 1, against which the crest-shaped curvilinear end 12 abuts, is formed into a crest-shaped curvilinear end 13 the configuration of which coincides and engages with the crest-shaped curvilinear end 12. Thereby, the upper surface passage 9 for the shutter plate 6 is formed into a crest-shaped meandering configuration of passage. In this case, the tape supply side reel 2 and tape take-up side reel 3 can be seen from the outside and this enables a user to recognize the taken-up status of the tape.

Figure 4:
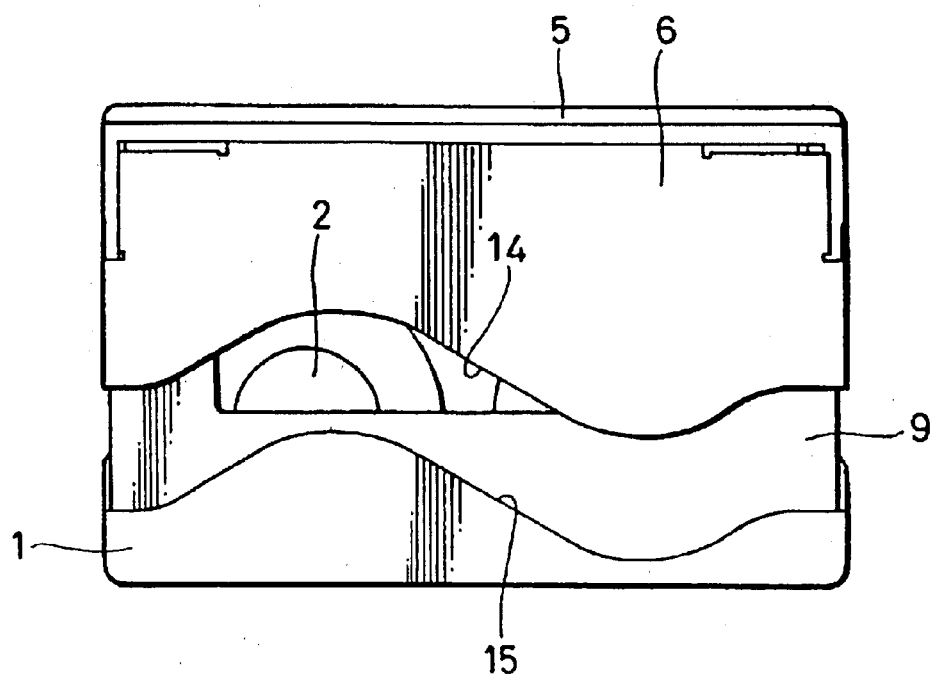
FIG. 4 is a plan view of the tape cassette illustrating still another example of the meandering passage.

Further, as illustrated in FIG. 4, the end of the shutter plate 6 is formed into a one-sided wave curvilinear end 14, and the level difference edge of the cassette casing 1, against which the one-sided wave curvilinear end 14 abuts, is formed into a one-sided wave curvilinear end edge 15 the configuration of which coincides and engages with the one-sided wave curvilinear end 14. Thereby, a one-side wave configuration of meandering passage is formed. In this case, only the tape supply side reel 2 can be seen from the outside, thereby the residual amount of tape which is wound around the tape supply side reel 2 can be recognized.

Also, regardless of the size of the tape cassette, the present invention can be widely applicable for the tape cassette having a mechanism in which a sliding member such as a shutter plate moves on the upper surface of the cassette casing.

As described above, the tape cassette according to the present invention has the following advantages. Specifically, in order to prevent the rectangular display label from being pasted on the upper surface of the cassette casing which is the passage for movement of the shutter, the end edge on a side opposite to the front lid of the shutter plate and the end of the cassette casing against which the end edge of the shutter abuts have each been made into a curvilinear configuration, thereby, the passage for movement of the shutter being made into a meandering configuration. As a result, even when the user tries to paste the display label onto the upper surface passage by mistake, the display label is not fitted within the upper surface passage 9, and it can immediately be recognized that the upper surface passage 9 is not the area for pasting the display label. This prevents the display label from being pasted onto the upper surface passage.

Also, there is another advantage that, by forming the upper surface passage into a meandering configuration, users can visually recognize that the upper surface passage is not the surface for pasting the display label.

INDUSTRIAL APPLICABILITY

The present invention is suitable for a tape cassette that is a recording medium in an extremely small-sized camcorder or the like, in which it is arranged to prevent a display label of the tape cassette from being pasted onto a portion other than the label area surface therefor.

DESCRIPTION OF REFERENCE NUMERALS

1 . . . CASSETTE CASING
2 . . . TAPE SUPPLY SIDE REEL
3 . . . TAPE TAKE-UP SIDE REEL
5 . . . FRONT LID
6 . . . SHUTTER
7 . . . LABEL AREA
8 . . . DISPLAY LABEL
9 . . . UPPER SURFACE PASSAGE
10, 11 . . . WAVY CURVILINEAR END EDGE
12, 13 . . . CREST-SHAPED CURVILINEAR END EDGE
14, 15 . . . ONE-SIDED WAVE CURVILINEAR END EDGE

What is claimed is:

1. A tape cassette comprising:

a cassette casing having accommodated therein a tape supply side and tape take-up side tape reels;

a openable and closable front lid for protecting a magnetic tape which is drawn out from the tape reel and crosses a mouth portion located at a front surface of the cassette casing, and a shutter retreating on an upper surface of the cassette casing in the way of sliding correspondingly with the operation of the front lid being open and retreated from the mouth portion, characterized by the edge of a side opposite to the front lid of the shutter and the edge of the cassette casing against which that edge of the shutter abuts, being made into a curvilinear configuration to thereby make the passage meander for movement of the shutter, in order to prevent a rectangular display label from being fitted on the upper surface of the cassette casing that is the passage for movement of the shutter.

2. The tape cassette according to claim 1, wherein the edge of the shutter and the edge of the cassette casing coincide and engage with each other when the shutter retreats.

3. The tape cassette according to claim 1, wherein the edge of the shutter and the edge of the cassette casing having the wavy curvilinear configuration brought into engagement with each other when the shutter retreats.

* * * * *